(12) United States Patent
Sasaki

(10) Patent No.: US 6,951,010 B2
(45) Date of Patent: Sep. 27, 2005

(54) PROGRAM SPECIFICATION GENERATING SYSTEM

(75) Inventor: Koji Sasaki, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 568 days.

(21) Appl. No.: 09/788,471

(22) Filed: Feb. 21, 2001

(65) Prior Publication Data

US 2002/0062477 A1 May 23, 2002

(30) Foreign Application Priority Data

Sep. 19, 2000 (JP) ...................................... 2000-283109

(51) Int. Cl.[7] ................................................. G06F 9/44
(52) U.S. Cl. ...................... 717/123; 717/106; 717/111; 717/136; 707/102; 714/20
(58) Field of Search ................................ 717/123, 106, 717/111, 136, 104, 110, 137, 142; 707/102; 714/20

(56) References Cited

U.S. PATENT DOCUMENTS

| | | | | |
|---|---|---|---|---|
| 4,819,233 A | * | 4/1989 | Delucia et al. | 717/129 |
| 4,860,203 A | * | 8/1989 | Corrigan et al. | 717/123 |
| 5,408,667 A | * | 4/1995 | Brodie et al. | 717/106 |
| 5,452,206 A | * | 9/1995 | Turrietta et al. | 715/531 |
| 5,513,305 A | * | 4/1996 | Maghbouleh | 715/500 |
| 5,524,192 A | * | 6/1996 | Dauerer et al. | 715/512 |
| 5,748,878 A | * | 5/1998 | Rees et al. | 714/38 |
| 5,748,975 A | * | 5/1998 | Van De Vanter | 715/531 |
| 5,752,058 A | * | 5/1998 | Van De Vanter | 715/531 |
| 5,761,408 A | * | 6/1998 | Kolawa et al. | 714/38 |
| 5,768,592 A | * | 6/1998 | Chang | 438/758 |
| 5,805,888 A | * | 9/1998 | Sasaki et al. | 717/141 |
| 6,243,859 B1 | * | 6/2001 | Chen-Kuang | 717/111 |
| 6,266,683 B1 | * | 7/2001 | Yehuda et al. | 715/512 |
| 6,389,481 B1 | * | 5/2002 | Malcolm | 719/310 |
| 6,493,868 B1 | * | 12/2002 | DaSilva et al. | 717/105 |
| 6,507,855 B1 | * | 1/2003 | Stern | 715/513 |

FOREIGN PATENT DOCUMENTS

JP      404055938 A   *   2/1992   ............. G06F/9/06

OTHER PUBLICATIONS

Douglas Kramer, "API documentation from source code comments: a case study of Javadoc", 1999, Proceedings of the 17th annual international conference on Computer documentation, ISBN:1–58113–072–4, pp.: 147–153.*

Dennie Van Tassel, "Comments in Programming Languages", 2004, Accessed and printed online on Apr. 28, 2005 at <http://www.gavilan.edu/csis/languages/comments.html>.*

Gosling, Joy, and Steele, "The Java Language Specification", Aug. 1996, Addison–Wesley, ISBN 0–201–63451–1, First Edition, Chapter 18, pp. 419–432.*

Robert Turner, "A Program Documentation Tool", 1992, Motorola, Inc., Technical Developments, vol. 17, pp. 87–89.*

(Continued)

*Primary Examiner*—Chameli C. Das
*Assistant Examiner*—J. Derek Rutten
(74) *Attorney, Agent, or Firm*—Staas & Halsey LLP

(57) ABSTRACT

A unique comment keyword is given to a comment statement in a source code. If the comment statements are insufficient, a comment including the comment keyword is inserted in this insufficient part thereof. After this processing, the comment statements are extracted from the source code to create specification data. The specification data is displayed on a display 15. An operator completes the specification data by editing. The comment statement in the source code is replaced with the comment statement in the complete specification data based on the comment keyword being used as a key.

18 Claims, 25 Drawing Sheets

OTHER PUBLICATIONS

Douglas Kramer, "API documentation from source code comments: a case study of Javadoc", Oct. 1999, Proceedings of the 17th annual international conference on Computer documentation, ISBN: 1–58113–072–4, pp. 147–153.*

"DocWiz: The JavaDoc Documentation Tool", DocWiz Product Website accessed Mar. 2004, archived Aug. 2000, <http://web.archive.org/web/20000817044128/http://www-.mindspring.com/~chroma/docwiz/>.*

* cited by examiner

Fig. 2

```
//outline
//    obtain line count of file
//return value
//    line count of file
//explanation of parameter
//    nothing
int getline()
{
    //initialize variable
    int c, nl;
    nl=0;
    //count number of lines till EOF is detected
    while((c=getchar()) !=EOF)
        if (c=='\n')
            ++nl;
    //display line count on screen
    printf("%d\n", nl);
    return nl;
}
```

Fig. 4

| IDENTIFIER | COMMENT ITEM | COMMENT |
|---|---|---|
| getline | OUTLINE | obtain line count of file |
| | RETURN VALUE | line count of file |
| | EXPLANATION OF PARAMETER | nothing |
| | FUNCTIONAL EXPLANATION | |

Fig. 5

Comment Keyword Format

☑ Extract Comment in Function (P)

Option

Definition of Comment Item
Function (F): [Functional Explanation ▼]
Member Function (M): [Functional Explanation ▼]

Definition of Keyword
Head Keyword (K): [*.*]   Enclosure Keyword (S): [        ]   ☐ Invalid (A)

Definition of Valid Column Position
Column Position (C): [1] – [999]

[OK]
[Cancel]

Fig. 7

```
///outline
///    obtain line count of file
///return value
///    line count of file
///explanation of parameter
///    nothing
int getline ()
{
    //initialize variable
    int c, nl;
    nl=0;
    // count number of lines till EOF is detected
    while ((c=getchar ()) !=EOF){
        // check whether it is line feed signal or not
        if (c=='\n')
            // count number of lines in the case of line feed signal
            ++nl;
    }
    // display line count on screen
    printf ("%d\n", nl) ;
    // return line count to caller
    return nl;
}
```

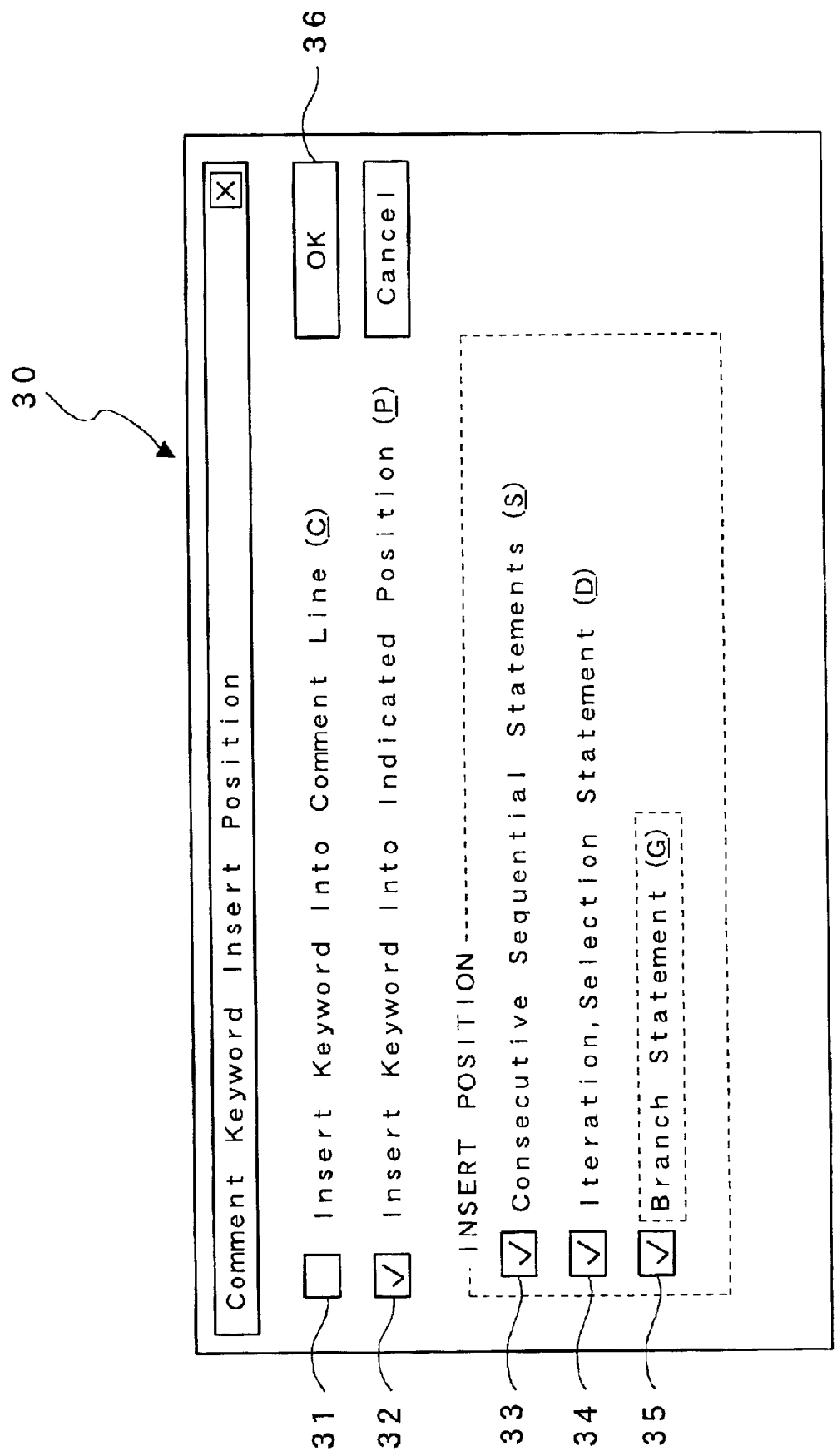

Fig. 9

```
//outline      obtain line count of file
//             return value
//             line count of file
//             explanation of parameter
//             nothing
int getline()
{
    int c, nl;
    nl=0;
    while((c=getchar()) !=EOF)
        if(c=='\n')
            ++nl;
    printf("%d\n", nl);
    return nl;
}
```

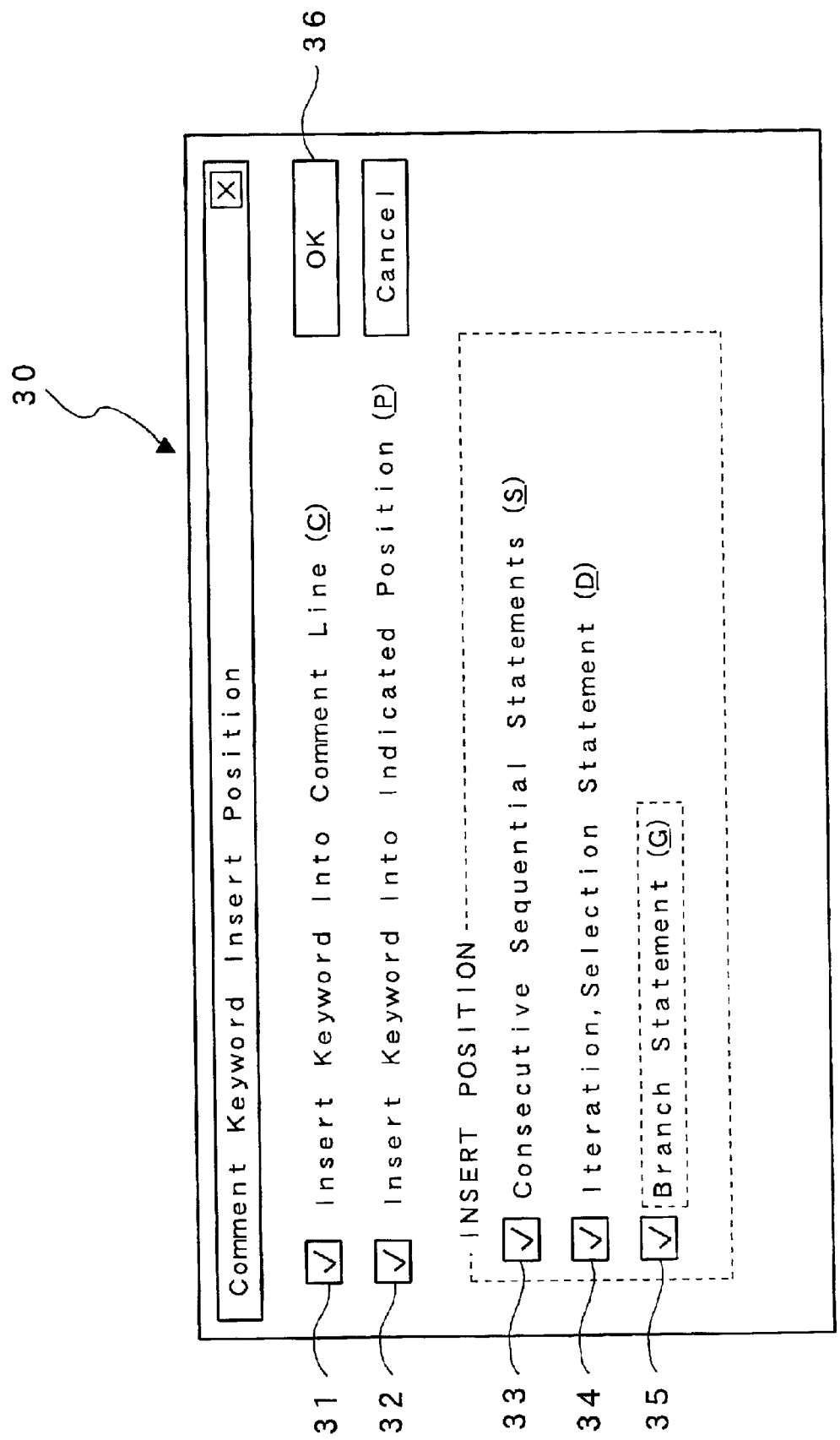

Fig. 11

```
//outline
///   obtain line count of file
///   return value
///     line count of file
///   explanation of parameter
///     nothing
int getline()
{
    //1)Initialize variable
    int c,nl;
    nl=0;
    //2)count number of lines till EOF is detected
    while((c=getchar())!=EOF)
        //2.1)check whether it is line feed signal or not
        if(c=='\n')
            //2.1.1)count number of lines in the case of line feed signal
            ++nl;
    //3)display line count on screen
    printf("%d\n",nl);
    //4)return line count to caller
    return nl;
}
```

Fig. 12

```
//outline
//    obtain line count of file
//return value
//    line count of file
//explanation of parameter
//    nothing
int getline ()
{
    //1)
    int c, nl;
    nl=0;
    //2)
    while ((c=getchar()) !=EOF)
        //2.1)
        if (c=='\n')
            //2.1.1)
            ++nl;
    //3)
    printf ("%d\n", nl);
    //4)
    return nl;
}
```

Fig. 13

```
//outline        obtain line count of file
//return value   line count of file
//explanation of parameter
//               nothing
int getline()
{
    //1)initialize variable
    int c, nl;
    nl=0;
    //2) count number of lines till EOF is detected
    while ((c=getchar()) !=EOF)
        //2.1)
        if (c=='\n')
            //2.1.1)
            ++nl;
    //3)display line count on screen
    printf(" %d\n", nl);
    //4)
    return nl;
}
```

Fig. 14

| IDENTIFIER | COMMENT ITEM | COMMENT |
|---|---|---|
| getline | OUTLINE | obtain line count of file |
| | RETURN VALUE | line count of file |
| | EXPLANATION OF PARAMETER | nothing |
| | FUNCTIONAL EXPLANATION | 1) initialize variable<br>2) count number of lines till EOF is detected<br>2. 1)<br>2. 1. 1)<br>3) display line count on screen<br>4) |

| Edit Screen | Explanation of getline Function | | |
|---|---|---|---|
| Name of Function | getline | | |
| Definition File | Main.cpp | Definition Line Number | 109 |

Declaration Format
int getline ()

Outline
obtain line count of file       — 41

Return Value
line count of file              — 42

Explanation of Parameter
nothing                         — 43

Functional Explanation          — 44
1) initialize variable
2) count number of lines till EOF is detected
2. 1)
2. 1. 1)
3) display line count on screen
4)

Fig. 16

```
Edit Screen          Explanation of getline Function

Name of Function                          getline
Definition File         Main.cpp     Definition Line Number  109
Declaration Format
int getline()
Outline
obtain line count of file
Return Value
line count of file
Explanation of Parameter
nothing
Functional Explanation
1) initialize variable
2) count number of lines till EOF is detected
2. 1) check whether it is line feed signal or not
2. 1. 1) count number of lines in the case of line feed signal
3) display line count on screen
4) return line count to caller
```

| IDENTIFIER | COMMENT ITEM | | COMMENT |
|---|---|---|---|
| getline | OUTLINE | | obtain line count of file |
| | RETURN VALUE | | line count of file |
| | EXPLANATION OF PARAMETER | | nothing |
| | FUNCTIONAL EXPLANATION | | 1) initialize variable<br>2) count number of lines till EOF is detected<br>2.1) check whether it is line feed signal or not<br>2.1.1) count number of lines in the case of line feed signal<br>3) display line count on screen<br>4) return line count to caller |

Fig. 18

```
//outline
//    obtain line count of file
// return value
//    line count of file
// explanation of parameter
//    nothing
int getline ()
{
    //1)initialize variable
    int c, nl;
    nl=0;
    //2) count number of lines till EOF is detected
    while((c=getchar()) !=EOF)
        //2.1)check whether it is line feed signal or not
        if (c=='\n')
            //2.1.1) count number of lines in the case of line feed signal
            ++nl;
    //3)display line count on screen
    printf("%d\n",nl);
    //4) return line count to caller
    return nl;
}
```

Fig. 20

| STATEMENT CATEGORY | NEST NUMBER | STATEMENT |
|---|---|---|
| COMMENT STATEMENT | 1 | //) initialize variable |
| SEQUENTIAL STATEMENT | 1 | int c, nl; |
| SEQUENTIAL STATEMENT | 1 | nl=0; |
| COMMENT STATEMENT | 1 | //) count number of lines till EOF is detected |
| ITERATION STATEMENT | 2 | while((c=getchar())!=EOF) |
| SELECTION STATEMENT | 3 | if (c=='\n') |
| SEQUENTIAL STATEMENT | 3 | ++nl; |
| COMMENT STATEMENT | 1 | //) display line count on screen |
| SEQUENTIAL STATEMENT | 1 | printf("%d\n",nl); |
| BRANCH STATEMENT | 1 | return nl; |

Fig. 21

| STATEMENT CATEGORY | NEST NUMBER | STATEMENT |
|---|---|---|
| COMMENT STATEMENT | 1 | //1) initialize variable |
| SEQUENTIAL STATEMENT | 1 | int c, nl; |
| SEQUENTIAL STATEMENT | 1 | nl=0; |
| COMMENT STATEMENT | 1 | //2) count number of lines till EOF is detected |
| ITERATION STATEMENT | 2 | while ((c=getchar()) !=EOF) |
| COMMENT STATEMENT | 2 | //2.1) |
| SELECTION STATEMENT | 3 | if (c=='\n') |
| COMMENT STATEMENT | 3 | //2.1.1) |
| SEQUENTIAL STATEMENT | 3 | ++nl; |
| COMMENT STATEMENT | 1 | //3) display line count on screen |
| SEQUENTIAL STATEMENT | 1 | printf("%d\n", nl); |
| COMMENT STATEMENT | 1 | //4) |
| BRANCH STATEMENT | 1 | return nl; |

Fig. 22

```
//outline         obtain line count of file
///return value   line count of file
///explanation of parameter
///               nothing
int getline()
{
    //2) initialize variable
    int c, nl;
    nl=0;
    //3) count number of lines till EOF is detected
    while((c=getchar()) !=EOF)
        if (c=='\n')
            ++nl;
    //6) display line count on screen
    printf("%d\n", nl);
    return nl;
}
```

Fig. 23

| STATEMENT CATEGORY | NEST NUMBER | STATEMENT |
|---|---|---|
| COMMENT STATEMENT | 1 | //2) initialize variable |
| SEQUENTIAL STATEMENT | 1 | int c, nl; |
| SEQUENTIAL STATEMENT | 1 | nl=0; |
| COMMENT STATEMENT | 1 | //3) count number of lines till EOF is detected |
| ITERATION STATEMENT | 2 | while ((c=getchar()) !=EOF) |
| SELECTION STATEMENT | 3 | if (c=='\n') |
| SEQUENTIAL STATEMENT | 3 | ++nl; |
| COMMENT STATEMENT | 1 | //6) display line count on screen |
| SEQUENTIAL STATEMENT | 1 | printf("%d\n",nl); |
| BRANCH STATEMENT | 1 | return nl; |

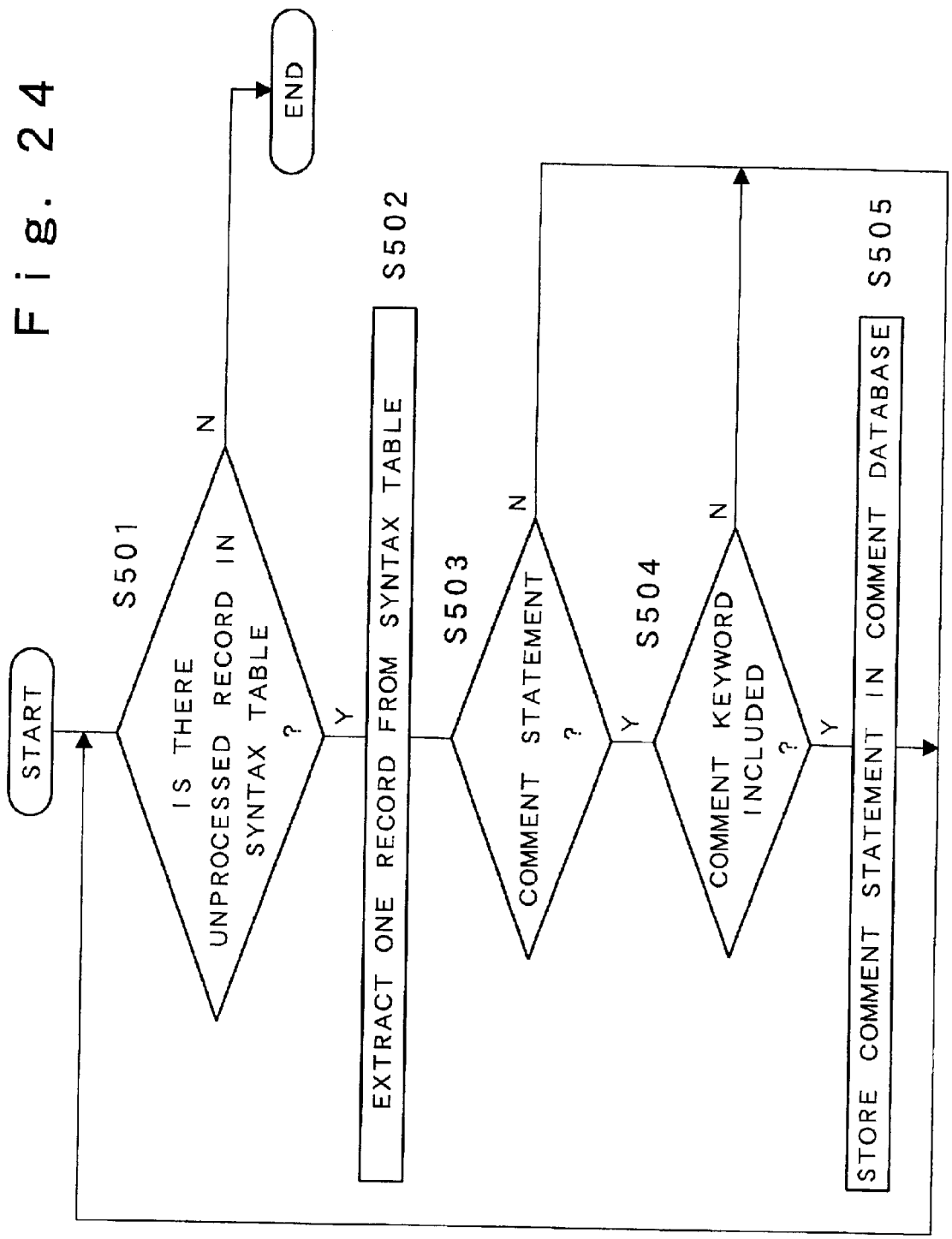

PROGRAM SPECIFICATION GENERATING SYSTEM

BACKGROUND OF THE INVENTION

1. Field of the Invention

The present invention relates to a program specification generating system for generating specification data based on a source code of a program written in a variety of programming languages.

2. Description of the Related Art

Generally, a source code written in a programming language such as C++ includes comment statements which are not converted into an object code even if compiled. Normally, the comment statement includes an explanation abut processing of the program. Thus, when the comment statement is extracted from the source code, the explanation about processing of the program is obtained.

Therefore, a specification generating system for automatically generating a program specification by extracting the comment statements from the source code, has been utilized. This specification generating system incorporates, in addition to the function of generating the specification by extracting the comment statements from the source code, a function used for an operator to edit the generated specification, and a function of updating the comment statements in the source code based on the edited specification.

Normally, the source code includes a plurality of "aggregates." For example, if the source code is written in C++, classes, member functions, external functions and exogenous variables correspond to the aggregates. Especially the function (the member function and the external function) among those aggregates, includes processing procedures, and is therefore referred to as a "aggregate having the processing procedures."

The comment statements are classified into a first type of comment statement written immediately before the aggregate, and a second type of comment statement written in the processing procedure in the "aggregate having the processing procedure." The conventional specification generating system automatically generates the specification by extracting the first type of comment statements from the source code. Then, an operator operates this specification generating system to edit the generated specification. To be specific, the operator inputs additional information and changes the description to correct the specification.

Further, this specification generating system updates the original source code based on the edited specification. That is, the specification generating system converts the content of the edited specification into the comment statement, and the converted statement(the first type of comment statement) is replaced with the previous statement disposed just before the aggregate corresponding thereto to update the source code.

The specification generating system according to the prior art explained above does not regard the second type of comment statement as a processing target. Supposing that the conventional specification generating system treats the second type of comment statement as the processing target, there arise the following problems. Namely, the problem is that even if the conventional specification generating system has generated the specification by extracting the first and second types of comment statements from the source code, change points by editing in the second type of comment statement can not be used to update the original source code.

It is because the conventional specification generating system is incapable of recognizing the position in the "aggregate having the processing procedure" (that is, a function) at which the second type of comment statement converted from the content of the edited specification should be disposed.

It may be considered that the specification generating system inserts the second type of comment statement corresponding to the change point into the function with reference to an absolute position of a description line number etc in the source code to update the source code. In this case, however, the source code must not be changed at all during the period till the change points by editing in the specification is used to update this source code after the specification has automatically been generated. That is, the operator becomes unable to modify the source code during this period. Therefore, an efficiency of development declines.

Accordingly, the conventional specification generating system has dealt with only the first type of comment statement as the processing target. That is, the conventional system generates the specification by extracting only the first type of comment statements from the source code. The specification generated based on only the first type of comment statements, however, has insufficient contents in description.

SUMMARY OF THE INVENTION

It is a primary object of the present invention to provide a specification generating system capable of dealing with the second type of comment statement also as a processing target.

To accomplish the above object, according to one aspect of the present invention, a specification generating system for generating specification data by extracting comment statements from a source code which should be processed, comprises a input device, a display device, a computer for executing processes based on a program, and a storage medium containing a specification generating program.

The specification generating program controls the computer to execute: a step of disposing a comment statement including an unique comment keyword at a position where a comment statement in a source code can be disposed; a step of generating specification data by extracting the comment statements each including the comment keyword; a step of displaying the specification data on the display device; a step of changing the comment statement in the specification data in accordance with an indication of changing the displayed data, if the indication is given through the input device; and a step of replacing the comment statement in the source code with the comment statement in the specification data whose comment keyword is coincident with the comment keyword of said comment statement in the source code.

With this architecture, the comment statement in the source code includes the comment keyword that can be uniquely identified. The comment statements are individually managed by their own comment keywords.

Thus, if the comment statements are extracted from the source code to generate the specification data and then the specification data is edited by an operator, the change points by editing in the specification data is reflected in the comment statements in the source code, with their comment keywords used as keys.

The comment statements in the source code are classified into the first type of comment statement written just before the aggregate and the second type of comment statement written in the aggregate having the processing procedures. Then, what is managed by the comment keyword may be only the second type of comment statement. Without being limited to the second type of comment statement, however, the first type of comment statement may also be managed by the comment keyword.

Note that the source code is written in a programming language such as C++, C, BASIC, Java, FORTRAN, PASCAL, COBOL and so on.

BRIEF DESCRIPTION OF THE DRAWINGS

The invention will be described below in details with reference to the accompanying drawings, in which:

FIG. 2 is a diagram showing an example of a source code;

FIG. 4 is a chart schematically showing elements of a comment database;

FIG. 5 is a diagram showing an example of a comment keyword format set screen;

FIG. 7 is a diagram showing an example of a source code;

FIG. 8 is a diagram showing an example of a comment keyword insert position set screen;

FIG. 9 is a diagram showing an example of a source code;

FIG. 10 is a diagram showing an example of a comment keyword insert position set screen;

FIG. 11 is a diagram showing an example of a source code;

FIG. 12 is a diagram showing an example of a source code;

FIG. 13 is a diagram showing an example of a source code;

FIG. 14 is a chart schematically showing elements of a comment database;

FIG. 15 is a diagram showing an example of an edit screen;

FIG. 16 is a diagram showing an example of an edit screen;

FIG. 17 is a chart schematically showing elements of a comment database;

FIG. 18 is a diagram showing an example of a source code;

FIG. 20 is a chart schematically showing contents of a syntax table;

FIG. 21 is a chart schematically showing contents of a syntax table;

FIG. 22 is a diagram showing an example of a source code;

FIG. 23 is a chart schematically showing contents of a syntax table;

FIG. 24 is a flowchart showing a process in S5 in FIG. 3; and

DESCRIPTION OF THE PREFERRED EMBODIMENT

A program specification generating system in one embodiment of the present invention will hereinafter be described with reference to the accompanying drawings. This specification generating system may be configured in such a way that a computer like a personal computer or a workstation etc implements software for executing processes which will be explained later on.

Figure 1:
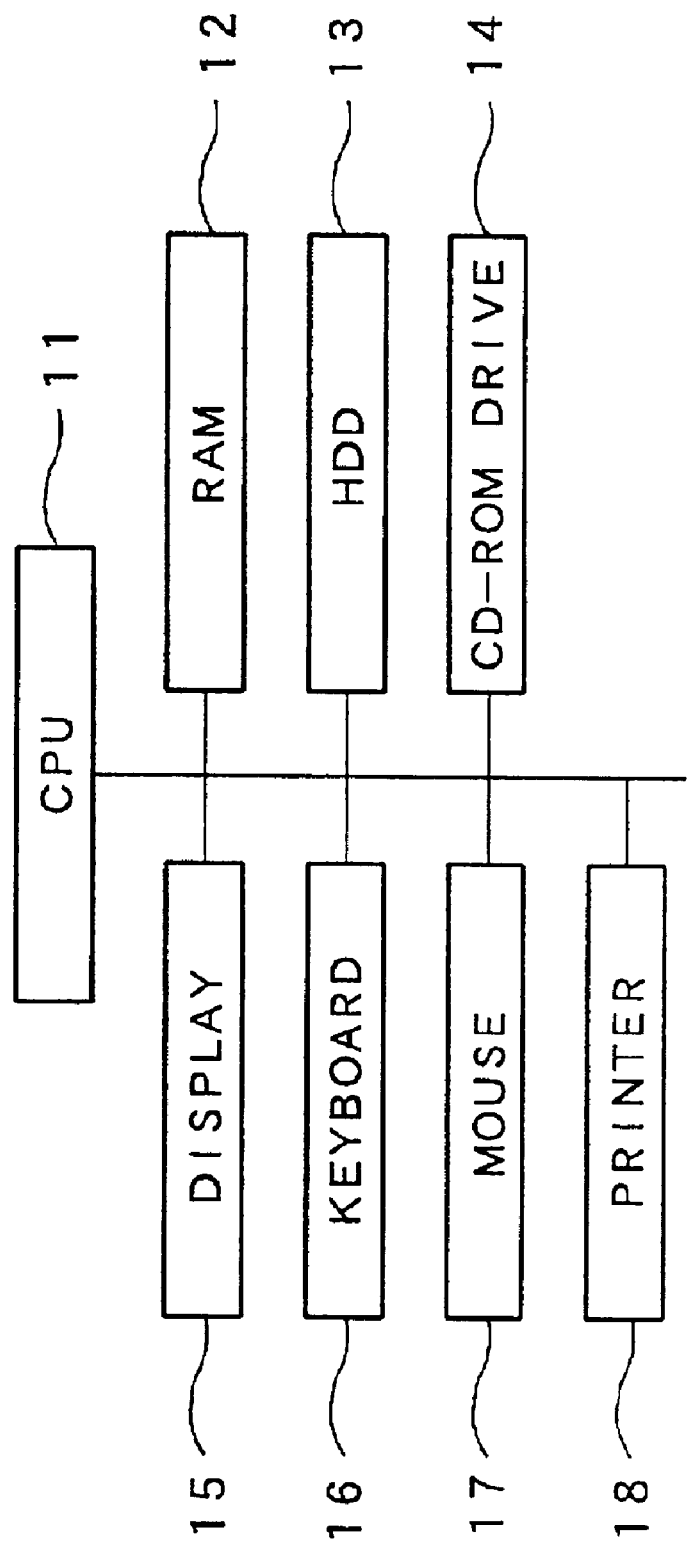
FIG. 1 is a diagram showing a hardware architecture of a specification generating system.

FIG. 1 is a diagram showing a hardware architecture of the specification generating system. As shown in FIG. 1, this specification generating system comprises a CPU 11, a RAM 12, an HDD 13, a CD-ROM drive 14, a display device 15, a keyboard 16, a mouse 17 and a printer 18, which are connected to each other via a bus and interfaces.

The CPU 11 is a computer for carrying out predetermined processes by executing a variety of programs. The RAM 12 is capable of storing data. Then, the CPU 11 loads a variety of programs and tables into the RAM 12.

The HDD (Hard Disk Drive) 13 has a plurality of platters capable of magnetically retaining information, and a magnetic head for reading and writing the data from and to the respective platters. Then, the CPU 11 controls the HDD 13 to read and write the data from and to its platters. The HDD 13 corresponds to a storage medium and a computer readable medium.

The CD-ROM drive 14 has a slot into which the CD-ROM is detachably loaded, and a pickup for reading the data from the CD-ROM. Then, the CPU 11 controls the CD-ROM drive 14 to read the data from the CD-ROM loaded therein.

The display device 15 includes a CRT (Cathode Ray Tube) or an LCD (Liquid Crystal Display) etc, and displays image data and character data on its screen. Then, the CPU 11 controls this display device 15 to display the image data and the character data on the screen thereof.

The keyboard 16 is used for an operator to input character codes. The mouse 17 is classified as a pointing device used for the operator to specify a position on a virtual space corresponding to a predetermined area on the display device 15. The CPU 11 receives inputs from the keyboard 16 and the mouse 17. The keyboard 16 and the mouse correspond to an input device.

The printer 18 is an apparatus for printing the characters and images on various types of mediums such as paper and so on. The CPU 11 transmits the character data and the image data to the printer 18 to print these pieces of data.

Note that software such as an operating system, an application program etc have previously been installed into the HDD 13. The software might be distributed in a state of its being written into the CD-ROM. In this case, the software is installed into the HDD 13 through the CD-ROM drive 14.

The operating system described above includes a kernel for system management, and a window system for providing GUI (Graphical User Interface). Then, the CPU 11 operates based on codes of the operating system in a state where at least a part of the operating system is developed on the RAM 12.

Further, the application program is defined as a program for actualizing the predetermined processes by calling functions of the operating system via API (Application Program Interface) provided by the operating system. Then, the CPU 11 executes the application program in a state where the OS runs. More specifically, this application program includes a software development environment having an editor and a compiler, and a specification generating program.

Then, the operator writes the source code by use of the editor to develop the software. The source code written is stored in the HDD 13. FIG. 2 is a chart showing an example of the source code written in C++.

Referring to FIG. 2, a line headed by "//" is a comment statement. The comment statements are classified into the first type of comment statement written just before a "aggregate," and the second type of comment statement written in a processing procedure within a "aggregate including the processing procedures" (function).

In the example shown in FIG. 2, the aggregate (function) is given at the seventh line "int getline( )" and after, therefore the first through sixth lines are categorized as the first type of comment statements. To be more specific, the first type of comment statements are "//outline," "//obtain line count of file," "//return value," "//line count of file, " "//explanation of parameter," and "//nothing."

Note that the first type of comment statement is described based on a predetermined description guideline. This description guideline prescribes that when the operator writes a program (source code) of a function, explanations about respective items such as "outline," "return value," and "explanation of parameter" with respect to this function should be written. It is also prescribed that the explanations about the respective items should be written immediately after the comment statements such as "//outline," "//return value," and "//explanation of parameter," respectively.

Referring again to FIG. 2, the ninth line, the 12th line and the 16th line are each written in the function and therefore defined as the second type of comment statements. Namely, the second type of comment statements are "//initialize variable," "count number of lines till EOF is detected," and "//display line count on screen." Note that EOF stands for an end of file signal.

The specification generating program is a program for generating, based on the source code described above, a specification corresponding to the source code. The processes of the CPU 11 that executes this specification generating program, will hereinafter be explained referring to a flowchart in FIG. 3. In first step S1 after the start of the flowchart in FIG. 3, the CPU 11 extracts the first type of comment statements from the source code, and creates a comment database that will hereinafter be explained.

FIG. 4 is a chart schematically showing elements of the comment database with respect to the aggregate (getline function) in the source code shown in FIG. 2. "Outline," "return value," "explanation of parameter," and "functional explanation" are set as the comment items in this database. Further, a plurality of comment fields (in a "comment" column in FIG. 4) are set corresponding to the those respective comment items in the comment database. Note that the comment database corresponds to specification data.

As shown in FIG. 4, "//obtain line count of file" next to "//outline" in the first type of comment statements in the source code shown in FIG. 2, is stored as a comment corresponding to the outline in the comment field. Similarly, "//line count of file" next to "//return value" is stored as a comment corresponding to the return value in the comment field. "//nothing" next to "//explanation of parameter" is likewise stored as a comment corresponding to the explanation of parameter in the comment field. Note that the comment field corresponding to the functional explanation is blank at this point of time because a comment therein is to be extracted from the second type of comment statements in a process that will be explained later on.

In S2, the CPU 11 displays a comment keyword format set screen shown in FIG. 5 on the display device 15. The operator inputs a format of comment keyword which will be mentioned later on in a head keyword box 21 on the comment keyword format set screen 20 by use of the keyboard 16. Note that "*.*)" is inputted as the format of the comment keyword in the example shown in FIG. 5. In this state, the operator clicks a button 22 by using the mouse 17 to set "*.*)" as the format of the comment keyword.

This symbol "*.*)" symbolizes the format prescribed beforehand in the specification generating program. More specifically, this symbol "*.*)" implies a hierarchically expressible item number such as "1," "1.2," "2.3.5" etc. As will be explained later on, the specification program gives each of the second type of comment statements the comment keyword unique to the statement in order to manage those statements.

Figure 6:
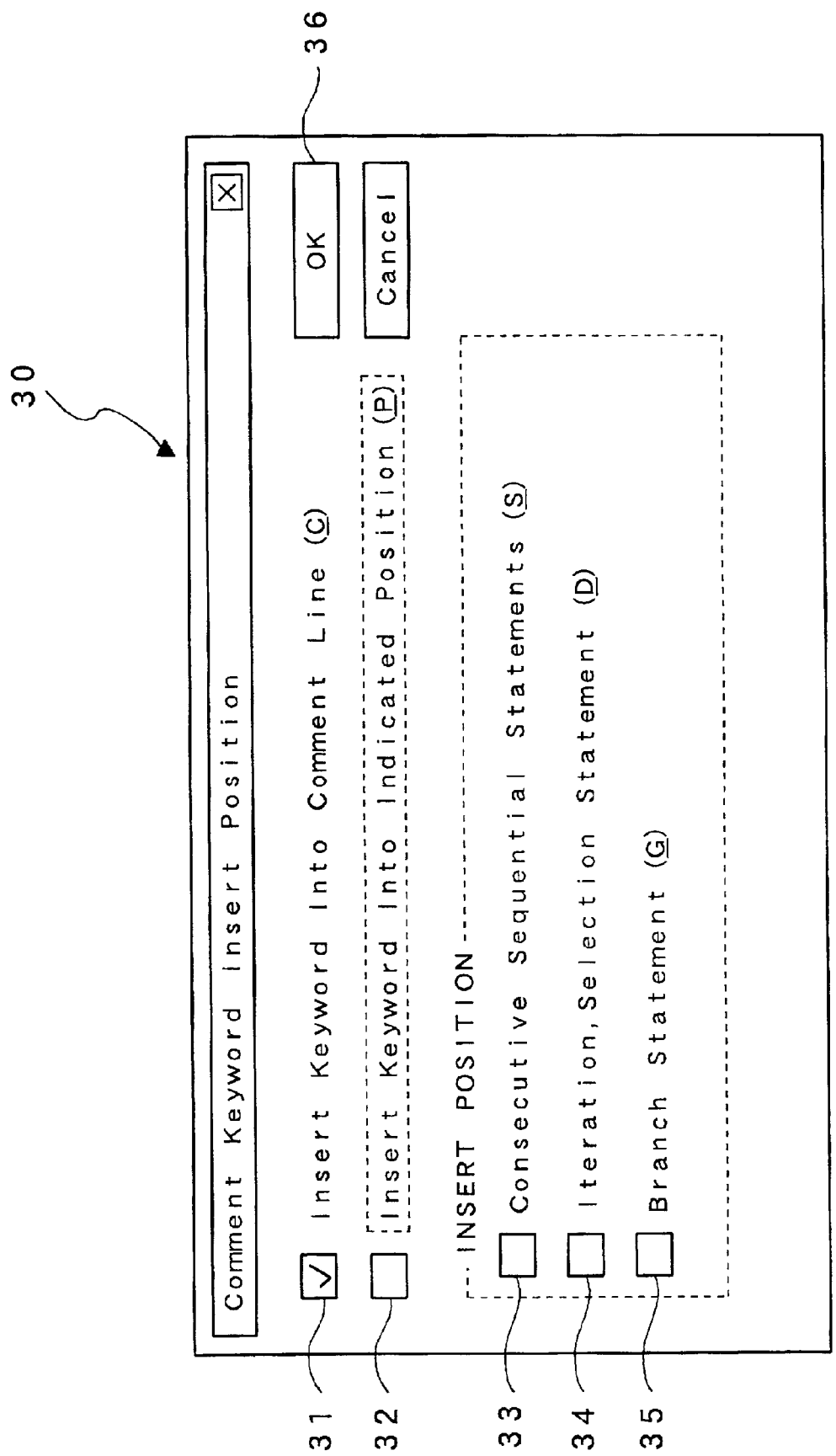
FIG. 6 is a diagram showing an example of a comment keyword insert position set screen.

In S3, the CPU 11 displays a comment keyword insert position set screen 30 shown in FIG. 6 on the display device 15. The operator determines an insert position of the comment keyword while looking at the comment keyword insert position set screen 30. The comment keyword insert position set screen 30 includes a couple of check boxes 31, 32. FIG. 6 shows a state where the operator checks only the first check box 31 by manipulating the mouse 17. When the first check box 31 is checked, the comment keyword is inserted, by the process that will be explained later on, in the second type of comment statements already written in the source code. Note that the setting shown in FIG. 6 is done, when the source code in which all the necessary comment statements have been written as in FIG. 7 is set as a processing target.

On the other hand, FIG. 8 shows a state where the operator checks only the second check box 32 by manipulating the mouse 17. When the second check box 32 is checked, the comment keyword is inserted, by the process that will be explained later on, in the given specified position within the function. The setting shown in FIG. 8 is done, when the source code in which none of the second type of comment statements is written as in FIG. 9 is set as a processing target.

Note that if the second check box 32 is checked as shown in FIG. 8, three check boxes 33, 34, 35 are newly displayed. These check boxes 33, 34, 35 are used for specifying indicated positions.

Then, if the third check box 33 is checked, a sequential statement is specified as a specified element (if the sequential statements are consecutive, however, only the head sequential statement is specified as the specified element). Namely, the head statement of the consecutive sequential statements and a non-consecutive sequential statement (a single sequential statement), are specified as the specified elements. If the fourth check box 34 is checked, iteration statements and selection statements such as "for," "do," "while," and "if" are specified as the specified elements. If the fifth check box 35 is checked, branch statements such as "return," "goto," and "continue" are specified as the specified elements.

FIG. 10 shows a state where the operator checks the first and second check boxes 31, 32 by manipulating the mouse 17. As shown in FIG. 10, the operator is able to check both of the check boxes 31, 32. In this case, the comment keywords are inserted in both of the indicated positions and the comment statements already written in the source code. Note that if the description, though some of the second type of comment statements are written, is insufficient, the setting shown in FIG. 10 is carried out.

Then, the operator clicks the button 36 on the comment keyword insert position set screen 30 shown in FIG. 6 and 8 or 10 by manipulating the mouse 17 to determine contents set on the comment keyword insert position set screen 30.

In step S4, the CPU 11 inserts the comment keyword into the source code. This comment keyword is inserted at the position set in step S3. In step S4, If set as shown in FIG. 6 in step S3, the comment keyword is inserted into the comment statement already written in the source code. That is, the source code in FIG. 7 is converted into what is shown in FIG. 11.

On the other hand, if set (S3) as shown in FIG. 8, the comment keyword is inserted in the indicated position in step S4. Namely, the source code in FIG. 9 is converted into what is shown in FIG. 12. As shown in FIG. 12, the comment keyword is inserted at the position where no comment exists in FIG. 9.

Further, if set (S3) as shown in FIG. 10, the comment keywords are inserted both in the comment already written in the source code and in the indicated position in this step S4. Namely, the source code in FIG. 2 is converted into what is shown in FIG. 13. The process in this step S4 will be explained in greater details later on.

In S5, the CPU 11 extracts the second type of comment statements from the source code, and stores the statements in the comment database. For example, "//1) initialize variable," "//2) count number of lines till EOF is detected," "//2.1)," "//2.1.1)," "//3) display line count on screen," and "//4)" are extracted from the source code in FIG. 13. Note that these comment statements include the comment keywords inserted in S4. Each of the extracted comment statements is stored in the comment field corresponding to the functional explanation in the comment database (FIG. 4). FIG. 14 is a chart schematically showing elements of the comment database in a state where those comment statements are stored. The process in step S5 will hereinafter be explained in depth.

In S6, the CPU 11 displays an edit screen shown in FIG. 15 on the display device 15. The operator edits the specification by manipulating the keyboard 16 while looking at the edit screen 40. Further, the CPU 11 updates the comment database based on the edited points of the specification.

As shown in FIG. 15, the edit screen 40 includes four edit boxes 41–44. The elements of the comment database shown in FIG. 14 are displayed in these edit boxes 41–44.

An element "obtain line count of file" in the comment field corresponding to the outline in the comment database, is displayed in the first edit box 41. An element "line count of file" in the comment field corresponding to the return value in the comment database, is displayed in the second edit box 42. An element "nothing" in the comment field corresponding to the explanation of parameter in the comment database, is displayed in the third edit box 43. Those elements displayed in the first through third edit boxes 41–43 are those extracted from the first type of comment statements.

Elements in the comment fields each corresponding to the functional explanation in the comment database are displayed in the fourth edit box 44. Namely, there are displayed "1) initialize variable," "2) count number of lines till EOF is detected," "2.1)," "2.1.1)," "3) display line count on screen," and "4)." The elements displayed in the fourth edit box 44 are those extracted from the second type of comment statements.

The operator can move the cursor on the screen at each of the edit boxes 41–44 and manipulates the keyboard 16 to change the entries in the respective edit boxes 41–44. In the example shown in FIG. 15, the entry of the fourth edit box 44 is insufficient, and therefore the operator supplements the entry. Namely, the operator adds explanatory comments to lines "2.1)," "2.1.1)," and "4)."

FIG. 16 shows an example of the edit screen 40 after the edit has been made. As shown in FIG. 16, the lines "2.1)," "2.1.1)," and "4)" in FIG. 15 have been replaced respectively with "2.1) check whether it is line feed signal or not," "2.1.1) count the number of lines in the case of line feed signal," and "4) return line count to caller."

After this edit has been made, the CPU 11 stores the comment database with the elements in the edit boxes 41–44 to update the comment database with respect to the change points described above. FIG. 17 is a chart schematically showing the elements in the comment database updated with respect to the change points.

As shown in FIG. 17, the element in the first edit box 41 on the edit screen 40 in FIG. 16 is stored in the comment field corresponding to the outline in the comment database. Similarly, the element in the second edit box 42 is stored in the comment field corresponding to the return value. The element in the third edit box 43 is likewise stored in the comment field corresponding to the explanation of parameter. Similarly, the element in the fourth edit box 44 is stored in the comment field corresponding to the functional explanation.

In S7, the CPU 11 indicates the printer 18 to print the specification. To be more specific, the CPU 11 obtains the elements in the comment database that have been processed in step S6, and converts the elements into data with a predetermined format to control the printer 18 to print the data as the specification corresponding to the obtained elements. This specification may be printed substantially in the same format as on the screen in FIG. 16. Note that the elements in the comment database may be converted into an HTML (HyperText Markup Language) format, file formats of various types of word processor software, or file formats of various types of spreadsheet software, and stored in the HDD13.

In S8, the CPU 11 updates the source code with respect to the first type of comment statements in the elements of the comment database that have been processed in S6. Note that if the display on the edit screen 40 in FIG. 15 is changed to that shown in FIG. 16 in step S6, the elements in the first through third edit boxes 41–43 corresponding to the first type of comment statements are not updated. In this case, neither the elements concerned in the comment database nor the contents of the first type of comment statements in the source code change.

In S9, the CPU 11 updates the source code with respect to the contents in the second type of comment statements in the elements of the comment database that have been processed in step S6. FIG. 18 is a chart showing the updated source code. As shown in FIG. 18, "2.1)," "2.1.1)," and "4)" in FIG. 13 are changed respectively into "2.1) check whether it is line feed signal or not," "2.1.1) count number of line in the case of line feed signal," and "4) return line count to caller." Note that the process in step S9 will hereinafter be explained in depth.

The process in step S4 in the flowchart shown in FIG. 3 will hereinafter be explained in greater details with reference to FIG. 19. Note that the flowchart in FIG. 19 starts after the CPU 11 has opened the source code stored in the HDD 13 and executed a reading process down to the beginning of the function.

Figure 19:
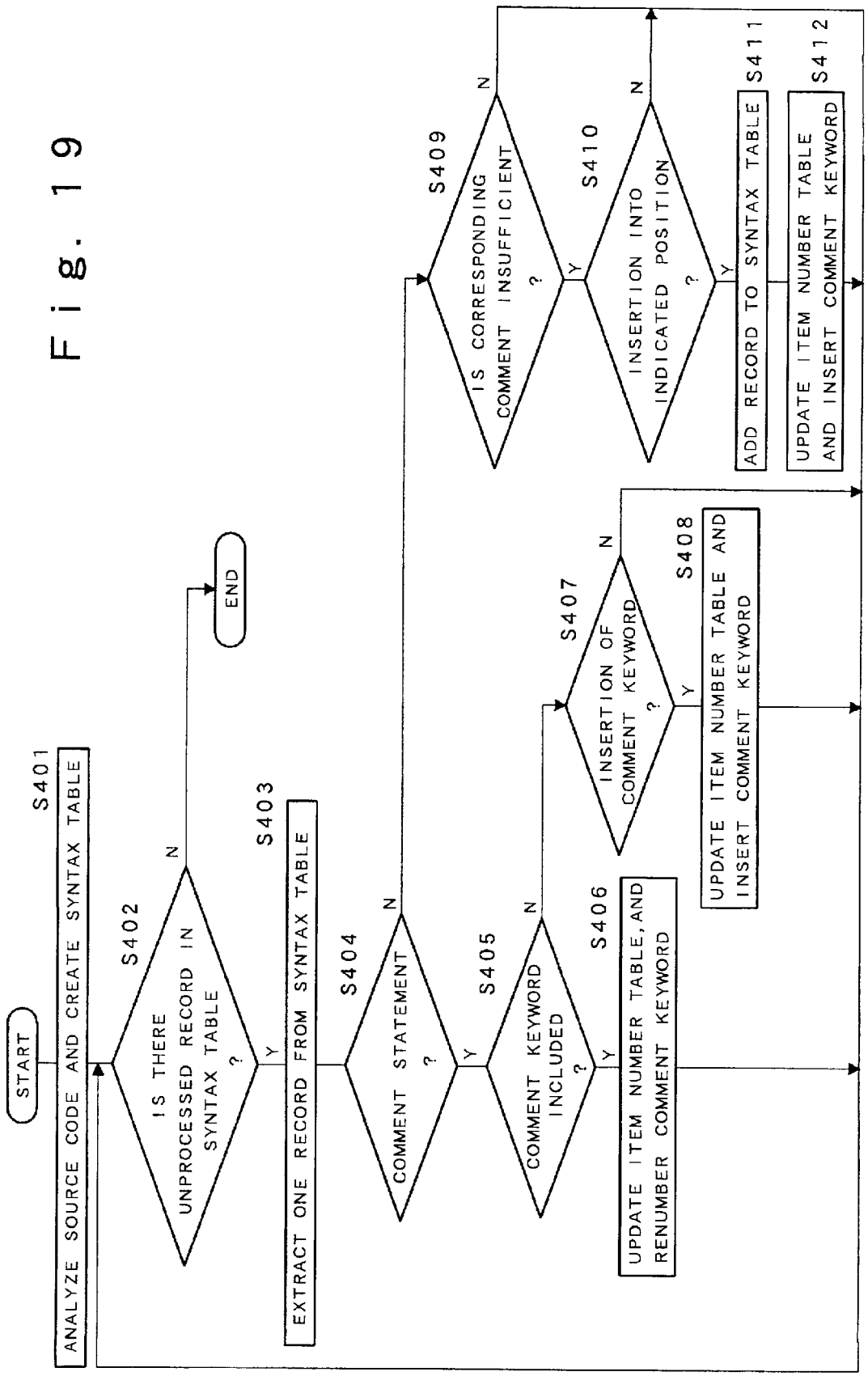
FIG. 19 is a flowchart showing a process in S4 in FIG. 3.

In first step S401 after the start of the flowchart in FIG. 19, the CPU 11 reads throughout the function as a processing target and analyzes the function to create a syntax table. Namely, the CPU 11 traces every statement in the source code to recognize the category of the statement and the depth of the nest in the logical structure of the programming language. The depth of the nest is expressed by a nest number (a natural number). The shallowest (outmost) nest corresponds to "1" as a nest number. Then, as the nest becomes deeper stepwise, the nest number is incremented one by one. Note that an area for creating the syntax table is assigned in the RAM 12 or the HDD 13.

Further, the CPU 11 assigns an item number table for managing the comment keyword in the RAM 12 or the HDD 13. The item number table contains a plurality of fields each of which can store "0" or a natural number. The number of fields in this item number table is coincident with the maximum nest number in the source code to be processed. Note that each field in the item number table has been zero-cleared in its initial state. In the following discussion, for an explanatory simplicity, the number of fields in this item number table is determined to three. In this case, a value in the initial state in the item number table is "0;0;0." The first field in the item number table corresponds to the nest number one, and the next field corresponds to the nest number two. Similarly, the subsequent fields in the item number table correspond in sequence to the nest numbers that follow.

FIG. 20 is a chart schematically showing the syntax table based on the source code in FIG. 2. This syntax table includes categories of the statements, the nest numbers, and the statements themselves written in the lines with respect to the respective lines of the source code. That is, each record in the syntax table includes a "STATEMENT CATEGORY" field, a "NEST NUBMER" field and a "STATEMENT" field. Note that the respective records are arrayed according to the statement entry order in the source code. FIG. 21 shows a syntax table obtained by executing processes on that shown in FIG. 20. The processes that will be explained later on correspond to steps S402 and after.

Referring to FIG. 20, the head record including the statement "//)initialize variable," stores "comment statement" in its "statement category" field, and stores "1" in its "nest number" field. Then, statements "int c,nl;" and "nl=0;" are defined as sequential statements in the "statment category" field, and the nest numbers thereof are each judged to be "1." The drecord including the statement "count number of lines till EOF is detected," stores "comment statement" in the "statement category" field, and the nest number is judged to be "1."

In the subsequent record including a statement "while((c=getchar( ))!=EOF)," the statement category is the iteration statement, and the nest number is judged to be "2." Namely, the CPU 11 judges based on the language structure of C++ that the nest becomes deeper by one step. In the next record including a statement "if (c=='¥n')," the statement category is the selection statement, and "3" is stored in the "nest number" field. That is, the CPU 11 judges based on the language structure of C++ that the nest becomes much deeper by one step.

In the next record including a statement "++nl;," the statement category is the sequential statement, and the nest number is judged to be "3." In the subsequent record including the statement "//display line count on screen," the statement category is the comment statement, and the nest number is judged to be "1." Namely, the CPU 11 judges based on the language structure of C++ that the nest becomes shallower by two steps. In the next record including a statement "printf("% d¥n",nl);," the statement category is the sequential statement, and the nest number is judged to be "1." In the subsequent record containing a statement "return nl;," the statement category is the branch statement, and the nest number is judged to be "1."

In the subsequent processes, the CPU 11 processes the syntax table sequentially from the head record thereof one by one. At the present stage, however, all the records in the syntax table are not yet processed, and none of the processed records exists.

In S402, the CPU 11 judges whether the syntax table contains an unprocessed record or not. Then, the CPU 11, if there is the unprocessed record, advances the processing to S403. Without the unprocessed record, the processing comes to an end.

In S403, the CPU 11 extracts one head record as a processing target record from the unprocessed records in the syntax table.

In S404, the CPU 11 judges whether the statement category of the processing target record is a comment statement or not. Then, the CPU 11, when judging that the statement category is the comment statement, advances the processing to S405. If judged to be other categories, the processing proceeds to S409.

In S405, the CPU 11 judges whether the statement (comment) of the processing target record includes a comment keyword or not. Then, the CPU 11, if the comment keyword is included, advances the processing to S406. Whereas if the comment keyword is not included, the processing proceeds to S407. Note that none of the statements in the syntax table in FIG. 20 includes the comment keyword. Therefore, if the syntax table in FIG. 20 is processed, it follows that the process in S406 is not executed only once. The process in S406 will be explained by exemplifying another syntax table.

In S407, the CPU 11 judges whether it has been set that the comment keyword should be inserted into the comment or not. As shown in FIG. 6 or 10, if the first check box 31 is checked on the comment keyword insert position set screen 30, the CPU 11 judges that the comment keyword should be inserted, and advances the processing to S408. While on the other hand, as shown in FIG. 8, if the first check box 31 is not checked on the comment keyword insert position set screen 30, the CPU 11 judges that the comment keyword should not be inserted, and loops the processing back to S402.

In S408, the CPU 11 updates the item number table, then generates a comment keyword and inserts this keyword into the comment statement. The item number table is updated based on the nest number. That is, the CPU 11 increments the field in the item number table corresponding to the nest number of the processing target record. Therefore, when the first record in the syntax table in FIG. 20 comes to be the processing target record, the nest number of this record is "1," and thus the value in the first field in the item number table is incremented by one. Namely, in this case, the value in the item number table is updated to "1;0;0" from "0;0;0." Note that values in the fields after the field including the updated value are zero cleared. For example, if the value in the item number table before being updated is "2;1;1," and the nest number of the processing target record is "1," the value in this item number table is updated to "3;0;0."

After this updating, the CPU 11 generates a comment keyword from the updated value in the item number table. For instance, if the value in the item number table is "2;1;1," "2.1.1)" is generated as the comment keyword. This comment keyword is, however, generated based on the field whose value is not,"0" among the fields in the item number table. Therefore, if the value in the item number table is "1;0;0", the comment keyword is generated in the form of "1)."

Further, the CPU 11 inserts the generated comment keyword immediately after "//" of the comment statement in the processing target record. For instance, the statement in the head record in the syntax table is changed to "1) initialize variable" from "//initialize variable".

On the other hand, what is executed in S409 is a process in the case where the statement of the processing target record comes under categories other than the comment (S404; No). Therefore, the statement category is one of the sequential statement, the iteration statement, the selection statement and the branch statement.

In this step S409, the CPU 11 judges whether the comment corresponding to the statement of the processing target record is insufficient or not. To be more specific, if the statement category in the record just before the processing target record is the comment statement, the CPU 11 judges that the comment statement is sufficient, and loops the processing back to S402. Note that if both of the statements of the processing target record and the record just before this target record are categorized as the sequential statements, the CPU 11 also judges that the comment statement is sufficient, and loops the processing to S402. While on the other hand, if categorized otherwise, the CPU 11 judges that the comment is insufficient, and advances the processing to S410.

In S410, the CPU 11 judges whether a setting which prescribes the comment keyword to be inserted in the indicated position, has been made or not. As shown in FIG. 6, if the second check box 32 is not checked on the keyword insert position set screen 30, the CPU 11 judges that the keyword should not be inserted, and returns the processing to S402. While on the other hand, as shown in FIG. 8 or 10, if the second check box 32 is checked on the keyword insert position set screen 30, the CPU 11 judges that the keyword should be inserted, and advances the processing to S411.

Even if the second check box 32 is checked on the keyword insert position set screen 30, the CPU 11 loops the processing back to S402 in the following three cases. The first case is that the third check box 33 is not checked when the statement of the processing target record is categorized as the sequential statement. The second case is that the fourth check box 34 is not checked when the statement of the processing target record is categorized as the iteration statement or the selection statement. The third case is that the fifth check box 35 is not checked when the statement of the processing target record is categorized as the branch statement.

In S411, the CPU 11 adds a new record between the processing target record and the record just before this target record in the syntax table. In the added record, it is set that the statement category thereof be a comment. Further, in this added record, its nest number is set to the same value as the nest number of the record immediately before the processing target record. Moreover, only the symbol "//" is set to the statement of the added record as a null comment. Then, the CPU 11 sets the newly added record as a processing target record instead of the previous processing target record.

For example, in the syntax table shown in FIG. 20, if the processing target record is a record including a statement "if (c=='¥n')," a new record is added between the target record and a record including a statement "while((c=getchar( ))!=EOF)." This added record becomes a processing target record.

In S412, the CPU 11, as in the case of S408, updates the item number table, and generates a comment keyword to insert this keyword into the comment statement. Note that the processing target record is the new record added in S411, and therefore the comment statement thereof contains only "//" as a null comment. Thus, for instance, if the comment keyword generated is "2.1)," the comment statement changes to "//2.1)" from "//." After this process, the CPU 11 loops the processing back to S402.

With the executions of the processes in the flowchart in FIG. 19, the syntax table in FIG. 20 is obtained by the process in S401 therein, in which case a syntax table in FIG. 21 is acquired by the processes S402 and after. Note that the source code includes only one function in the example given above. By contrast, if the source code includes a plurality of functions, the CPU 11 repeats the processes in the flowchart in FIG. 19, corresponding to the respective functions.

A process in S406 in the flowchart in FIG. 19, whose explanation is omitted in the above discussion, will hereinafter be explained with reference to a source code in FIG. 22. The source code in FIG. 22 is what is given a further change by the operator after having been processed once in accordance with the flowchart in FIG. 3. Therefore, the source code in FIG. 22 includes a comment keyword as being incomplete. Namely, the comment keyword is partially insufficient, and besides the number system of the comment keyword is disordered.

The process in S401 is executed upon this source code in FIG. 22, whereby a syntax table shown in FIG. 23 is created. Then, in the first step S402 just after S401, the syntax table includes an unprocessed record, and thus the processing proceeds to S403. In S403, the head record including the statement "//2) initialize variable" is obtained as a processing target record. In S404, because the statement category of the processing target record is a comment, the processing proceeds to S405. In S405, the statement of the processing target record includes the comment keyword, so that the processing goes forward to S406.

In S406, the CPU 11 updates the item number table to generate the comment keyword, then renumbers the comment keyword already set in the comment. Note that the item number table in the initial state is "0;0;0," and the nest number of the processing target record is "1." Therefore, this item number table is updated to "1;0;0." Consequently, the comment keyword generated becomes "1)." Then, the CPU 11 substitutes the generated comment keyword "1)" for "2)" in the comment statement "//2) initialize variable" of the processing target record to renumber the comment keyword. The comment statement of the processing target record after the renumbering becomes "//1) initialize variable."

Similarly, in this step S406, when the processing target record is a record including the statement "//3) count number of lines till EOF is detected," this statement, with an execution of the process in S406, becomes a statement "//2) count number of lines till EOF is detected." Similarly, when the processing target record is a record including the statement "//6) display line count on screen," this statement, with the execution of the process in S406, becomes a statement "//3) display line count on screen."

Therefore, when the syntax table in FIG. 23 is obtained in S401, the syntax table in FIG. 21 is acquired by the processes S402 and after. In the flowchart shown in FIG. 19, the CPU 11, even if the original source code includes an improper comment keyword, can obtain a syntax table with a correct comment keyword by renumbering the improper keyword.

The process in S5 in the flowchart shown in FIG. 3 will hereinafter be further explained with reference to a flowchart in FIG. 24. Note that the CPU 11 processes the records of the syntax table sequentially from its head record one by one in FIG. 24. In a state before starting the flowchart in FIG. 24, however, no records of the syntax table (FIG. 21) updated in S4 in FIG. 3 are processed, nor exists a processed record.

In first step S501 after the start of the flowchart in FIG. 24, the CPU 11 judges whether the syntax table includes the unprocessed record or not. Then, the CPU 11, if the unprocessed record exists, advances the processing to S502 and, whereas if not, finishes the processing.

In S502, the CPU 11 extracts one head record as a processing target record from the unprocessed records in the syntax table.

In S503, the CPU 11 judges whether the statement of the processing target record is categorized as a comment statement or not. Then, the CPU 11, if this statement category is the comment statement, advances the processing to S504 and, if categorized otherwise, loops the processing back to S501.

In S504, the CPU judges whether the statement (comment) of the processing target record includes a comment keyword or not. Then, the CPU, if the comment keyword is contained, advances the processing to S505 and, whereas if not, returns the processing to S501. Note that every comment statement in the syntax table in FIG. 21 involves the comment keyword.

In S505, the CPU 11 stores the statement (comment) of the processing target record in the comment database. Note that in the comment database created in S1 in the flowchart in FIG. 3, the comment field corresponding to the functional explanation therein is blank. In this step S505, the CPU 11 stores the comment statement of the processing target record in the comment filed corresponding to the functional explanation in the comment database. Then, the CPU 11 returns the processing to S501.

Upon a completion of the process in the flowchart in FIG. 24 (S5 in FIG. 3), the comment database in FIG. 4 is updated to a database as shown in FIG. 14. Note that the comment database in FIG. 14 is further updated in S6 in FIG. 3 to a database as shown in FIG. 17.

The process in S9 in the flowchart in FIG. 3 will befurther explained with reference to a flowchart in FIG. 25. Note that the CPU 11 processes the records of the syntax table (FIG. 21) sequentially from its head record one by one in the flowchart in FIG. 25. In a state before starting this flowchart in FIG. 25, however, the respective records of the syntax table are all unprocessed, and a processed record does not yet exist.

Figure 25:
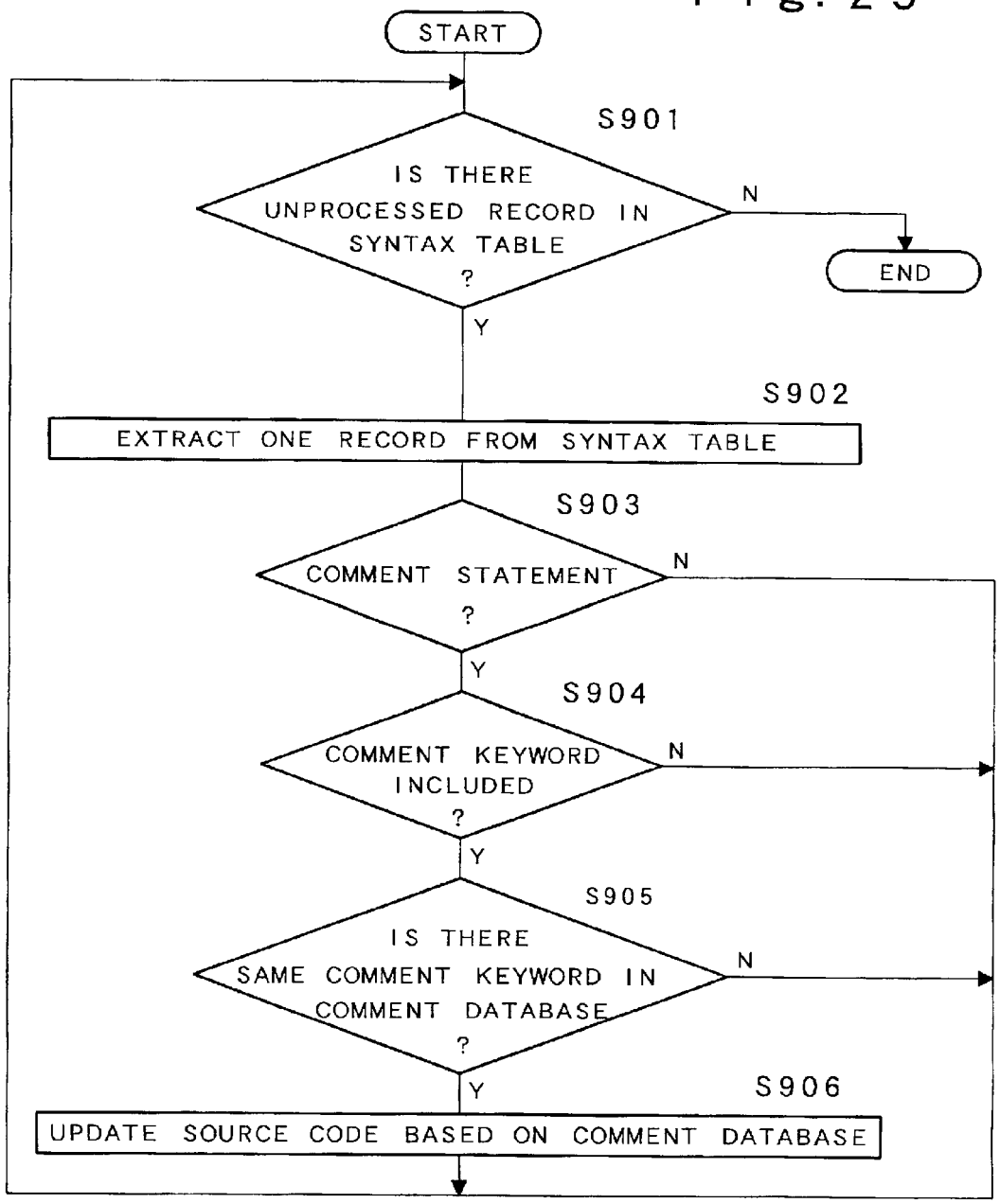
FIG. 25 is a flowchart showing a process in S9 in FIG. 3.

In first step S901 after the start of the flowchart in FIG. 25, the CPU 11 judges whether the syntax table includes the unprocessed record or not. Then, the CPU 11, if the unprocessed record exists, advances the processing to S902 and, whereas if not, terminates the processing.

In S902, the CPU 11 extracts one head record as a processing target record from the unprocessed records in the syntax table.

In S903, the CPU 11 judges whether the statement of the processing target record is categorized as a comment statement or not. Then, the CPU 11, if this statement category is the comment, advances the processing to S904 and, if categorized otherwise, loops the processing back to S901.

In S904, the CPU judges whether the statement (comment) of the processing target record includes a comment keyword or not. Then, the CPU, if the comment keyword is included, advances the processing to S905 and, whereas if not, returns the processing to S901. Note that every comment statement in the syntax table in FIG. 21 includes the comment keyword.

In S905, the CPU 11 judges whether or not the comment keyword included in the comment statement of the processing target record is stored in the comment field corresponding to the functional explanation of the comment database (FIG. 17). Then, the CPU 11, if this comment keyword is stored therein, sets this comment keyword as a processing target comment keyword and advances the processing to S906. Whereas if this comment keyword is not stored therein, the CPU 11 returns the processing to S901.

In S906, the CPU 11 updates the source code based on the comment database. To start with, the CPU 11 extracts a statement including the processing target comment keyword from the comment statements stored in the comment fields each corresponding to the functional explanation in the comment database (FIG. 17). Then, the CPU 11 specifies a comment statement including the processing target comment keyword among the comment statements in the source code (FIG. 13). After this processing, the CPU 11 substitutes the specified comment statement in the source code for the comment statement extracted from the comment database.

Figure 3:
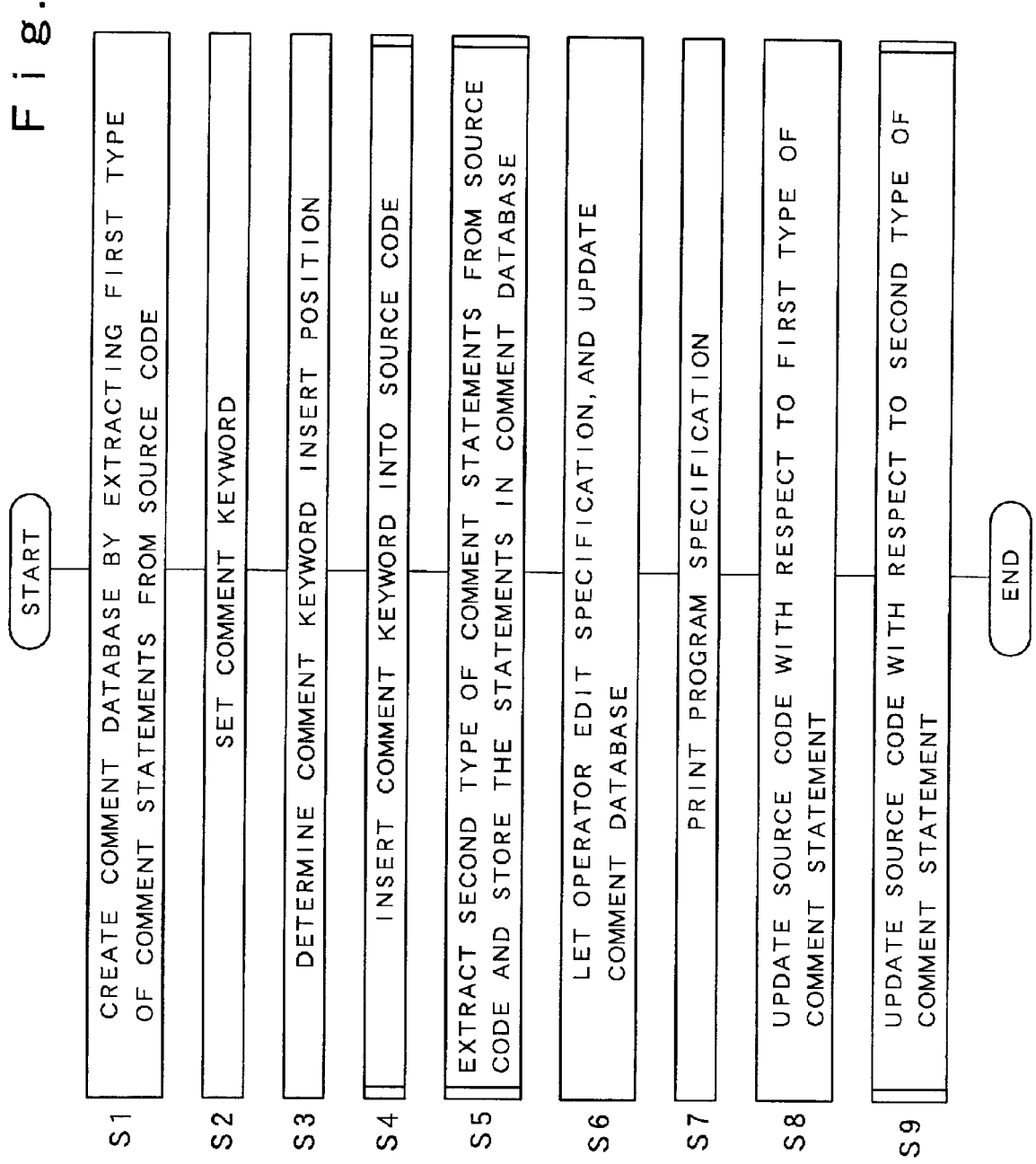
FIG. 3 is a flowchart showing processes of generating a specification.

With the execution of the process in this flowchart in FIG. 25 (S9 in FIG. 3), the source code is updated based on the elements in the comment fields each corresponding to the functional explanation in the comment database (FIG. 17) processed in S6 in FIG. 3. That is, the source code in FIG. 13 is converted based on the comment database in FIG. 17 into a source code in FIG. 18.

The specification generating system in the embodiment discussed above is capable of extracting the second type of comment statements as well as the first type of comment statements from the source code to generate the specification. The automatically generated specification is more solid than the specification includes only the first type of comment statements, and therefore the edit operation of the operator can be saved.

Further, the present specification generating system is capable of updating the source with respect to the change points in the edit operation of the specification. Namely, not only the change points corresponding to the first type of comment statements but also the change points corresponding to the second type of comment statements, are used for updating.

Note that the updating corresponding to the second type of comment statements is done based on the comment keywords. Therefore, even when the automatically generated specification is in the process of being edited, the operator may revise the source code within a range that does not change the comment keywords. Then, the specification generating system is also capable of updating the revised source code based on the change points in the edited specification. Therefore, there is a less constraint on the operation by the operator, and the development efficiency is enhanced.

In the specification generating system having the architecture described above according to the present invention, the comment statements of the source code are managed by the comment keywords. Therefore, even when the specification data including the comment statements of the source code are changed by editing, the source code is updated based on the comment keyword. Thus, even when the comment statement written in the aggregate having the processing procedures in the source code is the processing target, the change point by editing of the specification is used to update the source code.

What is claimed is:

1. A computer readable medium containing a specification generating program read by a computer connected to an input device and a display device and controlling the computer to execute:

disposing a comment statement including a corresponding unique comment keyword at all positions in a source code where a comment statement can be disposed;

disposing a comment statement at a position in an aggregate including processing procedures in the source code;

extracting comment statements from processing procedures within aggregates in the source code;

storing the extracted comment statements from processing procedures within aggregates in a comment database;

generating specification data using the comment statements stored in the comment database;

displaying the specification data on the display device;

changing the comment statement in the specification data in accordance with an indication of changing the displayed specification data, when the indication is given through the input device; and replacing the comment statement in the source code with the comment statement in the specification data whose corresponding unique comment keyword is coincident with the corresponding unique comment keyword of said comment statement in the source code.

2. A computer readable medium according to claim 1, wherein said specification generating program controls the computer to execute said disposing so as to dispose the comment statement at a position in an aggregate including processing procedures in the source code.

3. A computer readable medium according to claim 1, wherein said specification generating program controls the computer to execute said disposing so as to insert the comment keyword In a comment statement already included in the source code.

4. A computer readable medium according to claim 1, wherein said specification generating program controls the computer to execute said disposing so as to dispose the comment statement including the comment keyword at a position adjacent to a statement selected from the group consisting of a head statement of consecutive sequential statements, non-control statement, an iteration statement, a selection statement and a branch statement in the source code.

5. A specification generating method comprising:

disposing a comment statement including a corresponding unique comment keyword at all positions in a source code where a comment statement can be disposed;

disposing a comment statement at a position in an aggregate including processing procedures in the source code;

extracting comment statements from processing procedures within aggregates in the source code;

storing the extracted comment statements from processing procedures within aggregates in a comment database;

generating specification data using the comment statements stored in the comment database;

displaying the specification data on the display device;

changing the comment statement in the specification data in accordance with an indication of changing the displayed specification data, when the indication is given through the input device; and replacing the comment statement in the source code with the comment statement in the specification data whose corresponding unique comment keyword is coincident with the corresponding unique comment keyword of said comment statement in the source code.

6. A specification generating method according to claim 5, wherein said disposing is executed so as to dispose the comment statement at a position in an aggregate including processing procedures in the source code.

7. A specification generating method according to claim 5, wherein said disposing is executed so as to insert the comment keyword in a comment statement already included in the source code.

8. A specification generating method according to claim 5, wherein said disposing is executed so as to dispose the comment statement including the comment keyword at a position adjacent to a statement selected from the group consisting of a head statement of consecutive sequential statements, non-control statement, an iteration statement, a selection statement and a branch statement in the source code.

9. A specification generating system for generating specification data by extracting comment statements in a source code written in a predetermined programming language, comprising:

an input device;

a display device which displays information;

a computer which reads a program and executes processes based on the program; and a storage medium containing a specification generating program which controls the computer to execute:

disposing a comment statement including a unique comment keyword at all positions in a source code where a comment statement can be disposed;

disposing a comment statement at a position in an aggregate including processing procedures in the source code;

extracting comment statements from processing procedures within aggregates in the source code;

storing the extracted comment statements from processing procedures within aggregates in a comment database;

generating specification data using the comment statements stored in the comment database;

displaying the specification data on the display device;

changing the comment statement in the specification data in accordance with an indication of changing the displayed specification data, when the indication is given through the input device; and replacing the comment statement in the source code with the comment statement in the specification data whose comment keyword is coincident with the comment keyword of said comment statement in the source code.

10. A specification generating system according to claim 9, wherein said specification generating program controls the computer to execute said disposing so as to dispose the comment statement at a position in an aggregate including processing procedures in the source code.

11. A specification generating system according to claim 9, wherein said specification generating program controls the computer to execute said disposing so as to insert the comment keyword in a comment statement already included in the source code.

12. A specification generating system according to claim 9, wherein said specification generating program controls the computer to execute said disposing so as to dispose the comment statement including the comment keyword at a position adjacent to a statement selected from the group consisting of a head statement of consecutive sequential statements, a non-control statement, an iteration statement, a selection statement and a branch statement in the source code.

13. A computer comprising:

an input device;

a disposing unit which disposes a comment statement including a unique comment keyword at all positions in a source code where a comment statement can be disposed;

a disposing unit which disposes a comment statement at a position in an aggregate including processing procedures in the source code;

an extracting unit which extracts comment statements from processing procedures within aggregates in the source code;

a storing unit storing the extracted comment statements from processing procedures within aggregates in a comment database;

generating specification data using the comment statements stored in the comment database;

a generating unit which generates specification data using the comment statements stored in the comment database a display which displays the specification data;

a changing unit which changes the comment statement in the specification data based on an indication is given through the input device; and a replacing unit which replaces the comment statement in the source code with the comment statement in the specification data having a comment keyword coincident with the comment keyword of the comment statement in the source code.

14. A specification generating method comprising:

disposing a comment statement including a unique comment keyword at a plurality of positions within an interior of an aggregate where a comment statement can be disposed;

disposing a comment statement at a position in an aggregate including processing procedures in the source code;

extracting comment statements from processing procedures within aggregates in the source code;

storing the extracted comment statements from processing procedures within aggregates in a comment database;

generating specification data using the comment statements stored in the comment database;

displaying the specification data on a display device;

changing the comment statement in the specification in accordance with an indication of changing the displayed specification data, when the indication is given through an input device; and replacing the comment statement in the source code with the comment statement in the specification data whose comment keyword is coincident with the comment keyword of said comment statement in the source code.

15. The method according to claim 14, wherein the aggregate includes a main block of at least one of a function and a procedure.

16. The method according to claim 14, wherein the aggregate includes a main block of a class definition.

17. The method according to claim 14, wherein the source code includes source code written in at least one of C, C++, BASIC, Java, FORTRAN, PASCAL or COBOL.

18. A computer readable medium containing a specification generating program read by a computer connected to an input device and a display device and controlling the computer to execute:

disposing a comment statement including a corresponding unique comment keyword at positions immediately before aggregates and at positions in aggregates having processing procedures;

creating a comment database by extracting comment statements from positions immediately before aggregates in a source code;

setting a unique comment keyword;

determining a unique comment keyword insert position;

inserting the unique comment keyword at the unique comment keyword position in the source code;

extracting comment statements from processing procedures within aggregates;

storing the extracted comment statements from processing procedures within aggregates in the comment database;

generating specification data using the comment statements stored in the comment database;

displaying the specification data on the display device;

editing the specification data, by adding additional data or revising existing data, using the input device;

converting the edited specification data into comment statements; and replacing the comment statements in the source code with the comment statement in the specification data whose corresponding unique comment keyword is coincident with the corresponding unique comment keyword of said comment statement in the source code.

\* \* \* \* \*

UNITED STATES PATENT AND TRADEMARK OFFICE
CERTIFICATE OF CORRECTION

PATENT NO. : 6,951,010 B2
APPLICATION NO. : 09/788471
DATED : September 27, 2005
INVENTOR(S) : Koji Sasaki It is certified that error appears in the above-identified patent and that said Letters Patent is hereby corrected as shown below:

Column 15, Line 37 (claim 3, line 4), delete "In" and insert -- in -- therefor.
Column 15, Line 45 (claim 4, line 7), insert -- a -- before "non-control".
Column 16, Line 21 (claim 8, line 6), insert -- a -- before "non-control".

Signed and Sealed this

Second Day of October, 2007

JON W. DUDAS
*Director of the United States Patent and Trademark Office*